(12) United States Patent
Deaven (10) Patent No.: US 7,548,657 B2
(45) Date of Patent: Jun. 16, 2009

(54) ADAPTIVE VIDEO COMPRESSION OF GRAPHICAL USER INTERFACES USING APPLICATION METADATA

(75) Inventor: David M Deaven, Delafield, WI (US)

(73) Assignee: General Electric Company, Schenectady, NY (US)

( * ) Notice: Subject to any disclaimer, the term of this patent is extended or adjusted under 35 U.S.C. 154(b) by 691 days.

(21) Appl. No.: 11/165,768

(22) Filed: Jun. 25, 2005

(65) Prior Publication Data

US 2006/0294125 A1    Dec. 28, 2006

(51) Int. Cl.
*G06K 9/36*    (2006.01)
*G06K 9/46*    (2006.01)
(52) U.S. Cl. .......................... 382/243; 382/239
(58) Field of Classification Search ............... 382/162, 382/164, 173, 232, 233, 239, 243, 270, 305; 375/240.15; 348/E5.108, E5.112, E7.071; 341/51, 86; 345/1.1, 1.2, 586; 370/401, 370/463, 466, 468, 477, 503; 707/101
See application file for complete search history.

(56) References Cited

U.S. PATENT DOCUMENTS

| | | | |
|---|---|---|---|
| 5,127,064 A * | 6/1992 | Flinois et al. ............... | 382/149 |
| 5,422,674 A | 6/1995 | Hooper et al. | |
| 5,467,087 A | 11/1995 | Chu | |
| 5,987,183 A * | 11/1999 | Saunders et al. ............ | 382/239 |
| 6,057,851 A | 5/2000 | Luken et al. | |
| 6,167,062 A | 12/2000 | Hershey et al. | |
| 6,275,620 B2 | 8/2001 | de Queiroz et al. | |
| 6,324,305 B1 | 11/2001 | Holladay et al. | |
| 6,490,320 B1 * | 12/2002 | Vetro et al. ............ | 375/240.08 |
| 6,501,441 B1 | 12/2002 | Ludlke et al. | |
| 6,624,761 B2 | 9/2003 | Fallon | |
| 6,748,520 B1 | 6/2004 | Maynard et al. | |
| 6,754,221 B1 | 6/2004 | Whitcher et al. | |
| 6,965,457 B2 * | 11/2005 | Nakanishi et al. ............ | 358/2.1 |
| 7,110,608 B2 * | 9/2006 | Chan et al. ................... | 382/239 |
| 2006/0294125 A1 * | 12/2006 | Deaven ....................... | 707/101 |

* cited by examiner

*Primary Examiner*—Amir Alavi
(74) *Attorney, Agent, or Firm*—Dean D. Small; The Small Patent Law Group (57) ABSTRACT

Systems, methods and computer accessible medium are provided through which an input data stream consisting one or more media regions before entering a network to be rendered by a display coupled a remote video frame buffer is compressed on the basis of one or more configuration file metadata, source primitive metadata, and application high-level metadata of identified media regions. The input data stream is compressed by using one or more MPEG compression, JPEG compression, vector graphics compression, Huffman coding, or user defined compression scheme.

25 Claims, 10 Drawing Sheets

ADAPTIVE VIDEO COMPRESSION OF GRAPHICAL USER INTERFACES USING APPLICATION METADATA

FIELD OF THE INVENTION

This invention relates generally to a compression technique, and more particularly to a compression technique that operates on regions of pixels using a region based coding scheme that codes different types of data in different ways based on application metadata. Still more particularly, the image compression technique of the present invention evaluates the image to be compressed to determine its make-up and uses this information to determine the most effective combination of coding techniques to use to achieve a desired compression ratio.

BACKGROUND OF THE INVENTION

Computer systems such as a typical desktop personal computer (PC) or workstation generally use a frame buffer to store image data for each picture element on a display monitor (CRT or LCD). Recently increases in network bandwidth have made the implementation of remote video frame buffers possible even for graphically intensive and high frame rate displays. Functionally, each picture element on the display's screen has a corresponding instance of image data commonly referred to as a pixel. When used remotely the frame buffer is connected to the computing and rendering engines of a video display system via a local area network (LAN) connection. At present, a typical LAN is composed of nodes connected by network links operating at a theoretical maximum of approximately 100 or 1000 megabits per second. Since all network applications share the bandwidth, only a fraction of this bandwidth is available for a given application. Thus, the data transmitted to the remote video frame buffer must be compressed to fit within the available network bandwidth and be able to adapt to changing availability of network bandwidth as the aggregate network load changes.

The efficiency of the compression algorithm used for such a purpose depends on the ratio of compressed data size to raw data size, as well as the speed at which compression and decompression can be performed. Typically, compression algorithms are tuned for special purpose use cases such as image compression, which makes use of the assumption that pixel gradients within the image are small, solid color rendered images, which makes use of the assumption that large blocks of similar pixel values are located in close proximity on the screen. These algorithms are generally efficient for narrowly tailored applications but may be very ineffectual, inefficient, and inadequate for other applications. For example, JPEG and MPEG image compression is efficient for photographic images but not for line drawings. This means that for a mixed video display composed of images, line drawings, and solid color fills, a single compression algorithm such as JPEG or MPEG is not efficient. On the other hand, simple vector graphics primitives can efficiently encode line drawings but are inefficient for encoding photographic images or videos. Thus, knowledge of the gross spatial characteristics of the image permits selection of an optimal compression algorithm.

Video streams are sequences of static images which when displayed in sequence produce motion picture video. Depending on the type of image displayed, additional compression efficiency may be gained by making use of knowledge about the general behavior of the images close to one another in the sequence. This technique is called inter-frame compression. For example, MPEG video compression is efficient for compressing video streams in which subsequent images differ only by incremental motion of objects from one image frame to the next. However, MPEG compression is typically a computationally expensive operation due to the fact that the compression algorithm must perform exhaustive searches for portions of the image that are in motion. If these "motion vectors" were known in advance, MPEG compression would be much less difficult to execute. In summary, knowledge of the gross temporal characteristics of the video stream, which are computationally expensive to deduce, after the stream has been produced would greatly aid the computational efficiency of the compression algorithm.

For the reasons stated above, and for other reasons stated below which will become apparent to those skilled in the art upon reading and understanding the present specification, there is a need in the art for computationally efficient system for compressing data. There is also a need for an improved system and method for increasing the throughput of a communication channel.

BRIEF DESCRIPTION OF THE INVENTION

The above-mentioned shortcomings, disadvantages and problems are addressed herein, which will be understood by reading and studying the following specification.

In one aspect, a method for transferring data between a source device producing data having one or more media regions and video frame buffer is described. The one or more media regions is analyzed to select a metadata dependent compression algorithm best suited for the given data region. The metadata description is one of configuration file metadata, source primitive metadata, and application high-level metadata. The method may select MPEG compression, JPEG image compression, vector graphics compression, Huffman coding, H.261 compression, or user defined or associated compression algorithm. When metadata description is not adequate for a selection of a compression algorithm then the system selects a default compression or sends the packet through uncompressed.

In another aspect, a computer accessible medium having executable instructions for directing a data processor to transmit data to a remote frame buffer by dividing a mixed media stream into a number of regions. Each can be described by high-level metadata on functions and type of display for regions of the mixed media stream data, identifying source primitive metadata on application metadata from primitive operations, identifying information defining special and temporal characteristics of the mixed media stream data regions. The processor then selects the compression method based on the application metadata In yet another aspect, a data compression system is described having a processor, storage device, and software means operative in the processor for identifying at least one metadata and compressing an input stream based on the identified metadata.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into five sections. In the first section, a system level overview is described. In the second section, methods of embodiments are described. In the third section, the hardware and the operating environment in conjunction with which embodiments may be practiced are described. In the fourth section, particular implementations are described. Finally, in the fifth section, a conclusion of the detailed description is provided.

System Level Overview

Figure 1:
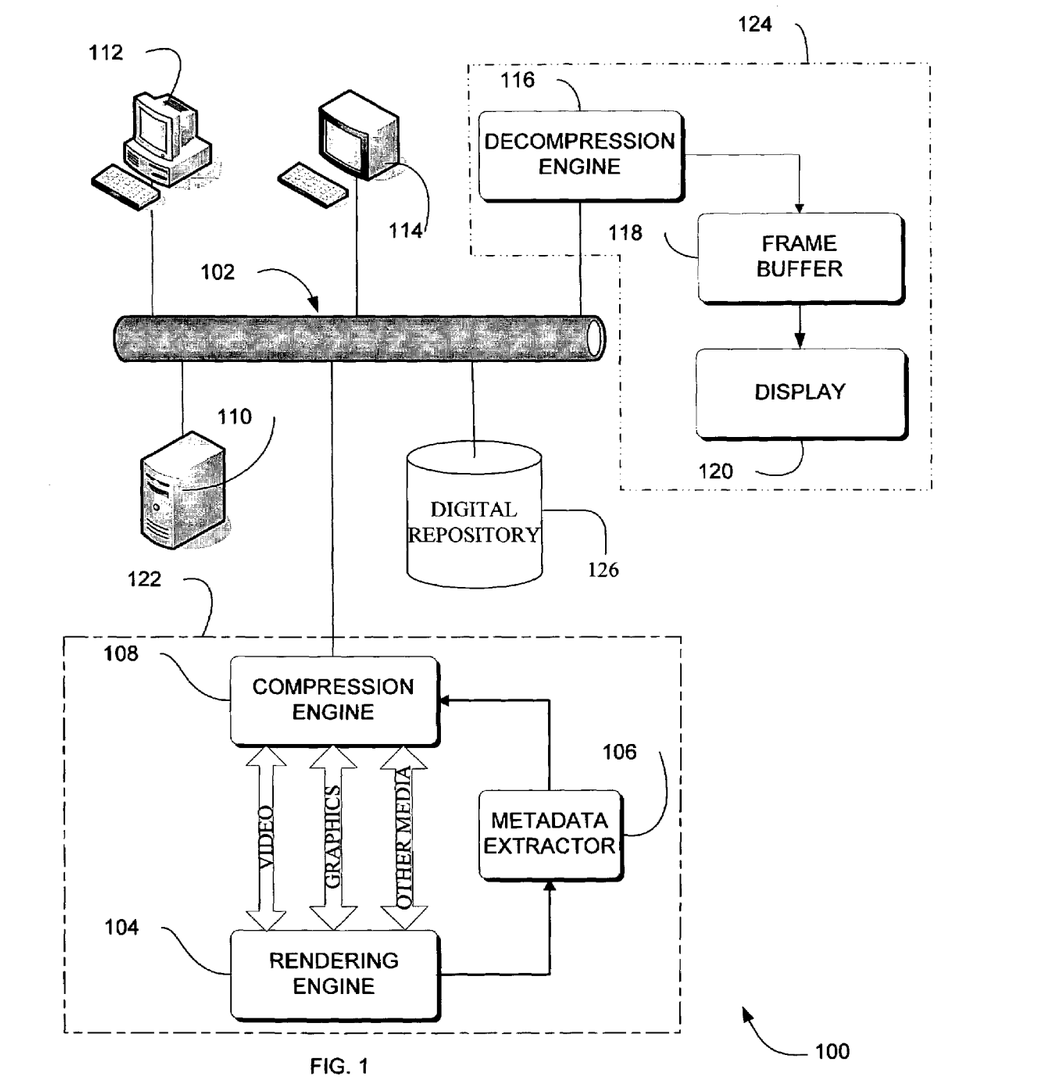
FIG. 1 is a diagram illustrating a system-level overview of an embodiment for compressing input data from a rendering engine and frame buffer for holding the decompressed input data for subsequent display.

FIG. 1 is a block diagram that provides a system level overview of a system for exchanging data between a rendering engine and a display device. System 100 solves the need in the art for increasing the throughput of a communication channel.

FIG. 1 depicts a network arrangement 100 for inputting, accessing, and interacting with information from a rendering engine 104. A user accesses the rendering engine 104 through a terminal such as 124. The terminal 124 provides a user with a sign-on facility to the rendering engine 104 as well as the ability for certain users to change or customize the rendering engine 104. The information from rendering engine 104 may be stored in storage server 110 for viewing by computer system 124 at a later time or for further processing by rendering engine 104. Further, the information in server 110 can be stored in a compressed or decompressed format and will depend on the available resources at system 100. For example, to preserve the bandwidth of the network 102 for other users or applications it would be more advantageous to store the information in a compressed state. However, in a direct connection between the computer system 124 and the server 110 a decompress state for the information is preferred since it would decrease delays that are introduced by the decompression procedure 116 at the display 120. In the preferred embodiment of the system 100, a user at terminal 124 can access the network 102 to connect to rendering engine 104. In other embodiments, rendering engine 104 can reside on an intranet, an extranet, a local area network ("LAN"), a wide area network ("WAN"), or any other type of network or stand-alone computer. If the rendering engine 104 resides on a network, then the computer or terminal at 124 is any machine or device capable of connecting to that network. If the rendering engine 104 can be accessed by the Internet, then the computer or terminal at 124 is any machine or device capable of connecting to the Internet. If the computer system at 122 is a stand-alone computer, then the rendering engine is the same device as the computer at 122. The user can be linked to the rendering engine 104 by fiber optic cable, wireless system, by a gateway, by a network, or a combination of these linking devices.

The rendering engine 104 is device that produces stream of data consisting of one or more video, graphics, or other media for reproduction at computer 124. The stream of data can be referred to as input data, as an input data stream, as mixed media data, and as mixed media data stream without departing from the original concept of having data be one or more video, graphics, text, animation, or any other data or information produced by a computer. The stream of data can be partioned at computer 124 to be displayed in sections of the display or by other devices that reproduce the data such as audio, video, or text reproducing devices. Rendering engine 104 can be used in higher resolution medical imaging, in volume rendering of computed tomography (CT) and magnetic resonance imaging (MRI), in 3D visualization that permits rotation and scaling, or for any other purpose that aides in the understating of the physical world.

Metadata extractor 106 gathers data about the input data stream indicates one or more configuration file metadata, primitive object, or application that was used by the rendering engine 104 to produce the stream data. The metadata extractor 106 gathers data about the data produced by the rendering engine 104.

Compression engine 108 is one or more compression scheme that could be used for compressing the stream data produced by the rendering engine 104. This compression can be applied to regions of the data stream or to the whole stream. Compression engine 108 is a process or device that receives stream data from the rendering engine 104 and data about the stream data from the metadata extractor 106 to select the appropriate compression algorithm. The compression algorithm can be one of Moving Picture Experts Group (MPEG) compression, Joint Photographic Experts Group (JPEG) compression, wavelet compression, fractal compression, vector graphics compression, Huffman coding, H261, and other user selected compression techniques. The goal of the compression techniques is to reduce the number of bits used to represent the stream data or the processed portion of the data stream. These techniques generally seek to strike a balance between transmission time, the amount of data over a channel (bandwidth), and quality of the data stream received. Some of these techniques are lossless, meaning that they preserve all information of the original data so that it is reproduced exactly when the data is decompressed. Other techniques commonly referred to as lossy, discard information that is visually insignificant. By only approximating the original data (rather than reproducing it exactly), lossy techniques are generally able to produce higher compression ratios than lossless techniques. In selecting the appropriate compression technique among those currently available, the user must consider the particular stream data to be compressed, the desired compression ratio and the quality as well as transmission time and bandwidth requirements, with the understanding that higher compression ratios lead to lower transmission times and bandwidth requirements but also produce lower quality images. It should be noted that transmission time is the time taken for the stream of data to go from the rendering engine 104 and reach computer 124. While the bandwidth of the channel adds to the transmission time, the choice of compression algorithm has a substantial impact on the transmission time as well as the quality of the compression.

Decompression engine 116 expands the data stream produced by the rendering engine 104 to be displayed on display 120. The mixed media data per screen (regions) is read out from LAN 102 by decompressing engine 116 and transferred to frame buffer 118 after appropriate processing. Then, frame buffer 118 writes and stores the mixed media data each corresponding to one screen transferred from decompression engine circuit 116 via a data bus (not shown). Internal circuits in display 120 generate an image signal from the mixed media data each corresponding to one screen transferred from decompression engine circuit 116, thus, enabling the image signal to be displayed on display 120.

Frame buffer 118 holds the data stream until it can be displayed. Each address of the frame buffer 118 corresponds to a pixel on the display terminal 120. In this way the frame buffer is a representation of the surface of the display and a cluster of pixels that forms an image or segment of the display can be represented as a collection of addresses on the frame buffer 118. Frame buffer 118, constituted of a writable semiconductor memory (SDRAM (Synchronous Dynamic Random Access Memory), for example), a DRAM (Dynamic Random Access Memory), a Rambus DRAM or the like and writes and stores the mixed media data per screen (frame) transferred via a data bus from decompression engine 116. The stored mixed media data is read out per screen from frame buffer 118 by display 120 when viewing by a user.

Figure 2:
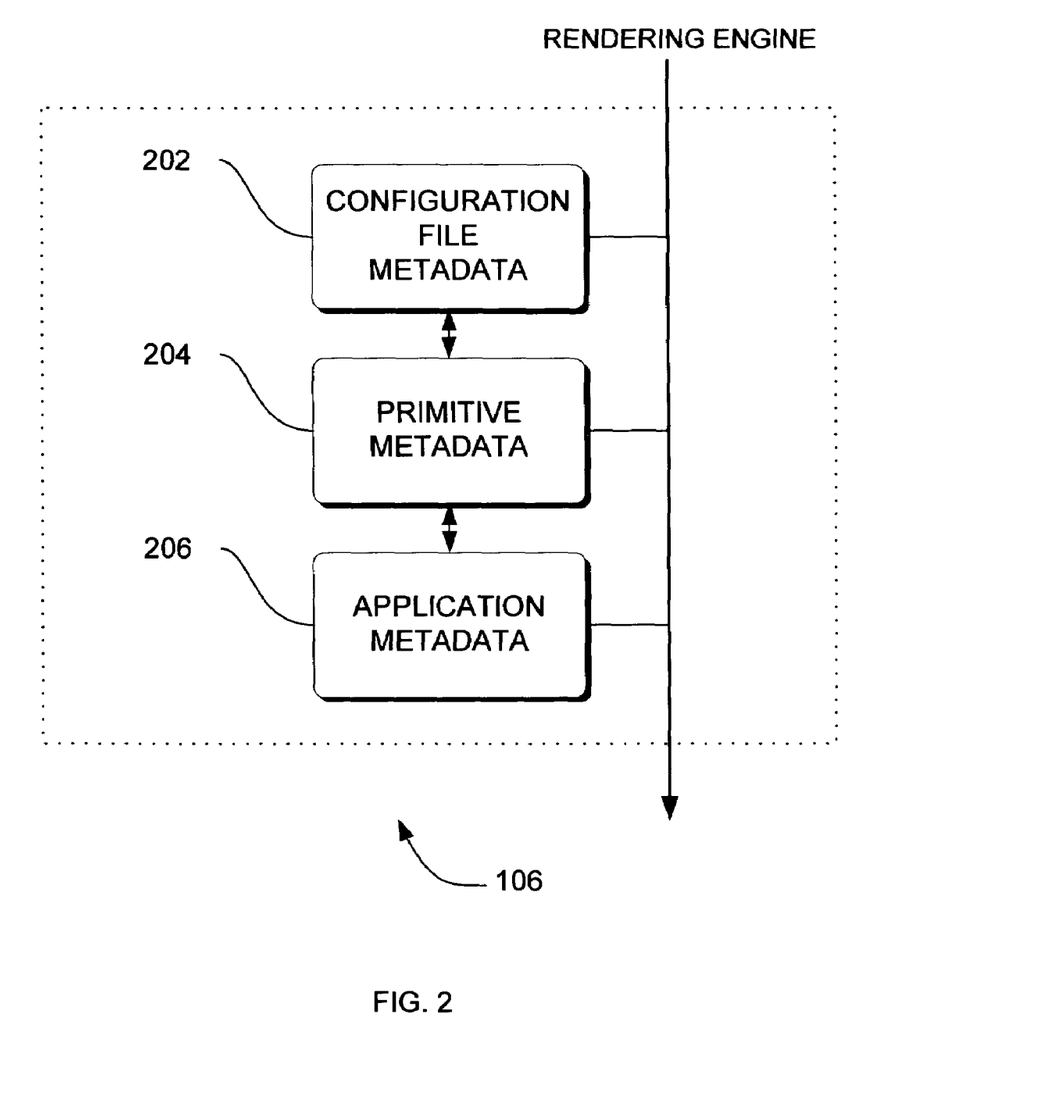
FIG. 2 illustrates the use of configuration, primitive, and application metadata according to an embodiment for compression of input data.

FIG. 2 is a block diagram that provides a system level overview of the metadata extractor 106 for exchanging data between a rendering engine 104 and a display device 120. System 106 solves the need in the art for increasing the throughput of a communication channel and the quality of the decompressed stream at computer 124.

The configuration file metadata 202 represents information or data about the application metadata stored in a configuration file that defines geometric regions of the frame buffer 118 and declares the gross special and temporal characteristics of the region. The compression engine can use this information to engage appropriate codecs for each region. This technique can be employed for any application without modifying the application source code.

The primitive metadata 204 gathers data or information on systems with a localized, modular rendering engine directly from inspection of the rendering primitive operations. For example, an X windows server has useful information about the window objects assigned to each software application on a display 120, as well as the distribution of rendering operations over time the application is making. If a single application is found to be rendering to a specific window using solid color fill operations, the X server can generate metadata directing the compression engine to use appropriate codecs, and as the windows are reconfigured to different locations on the screen, the server can update the metadata directly. This technique can be employed without modifying application source code, but by modifying the rendering engine source code.

The application metadata 206 exploits that fact that a software application can contain logic to determine what functions it is performing, and what type of displays 120 are used to present the application data. Depending on the logical flow of the application, metadata can be directly generated as regions of the display 120 are allocated for use in image, video, or solid color or line drawing user interface presentations.

The configuration metadata 202, primitive metadata 204, and application metadata 206 can cooperate with each other to produce a combined metadata packet to be used by the compression engine 108. Likewise the individual data from the metadata components can be processed individually by the compression engine 108 to reduce the number of bits of the data stream.

Figure 3:
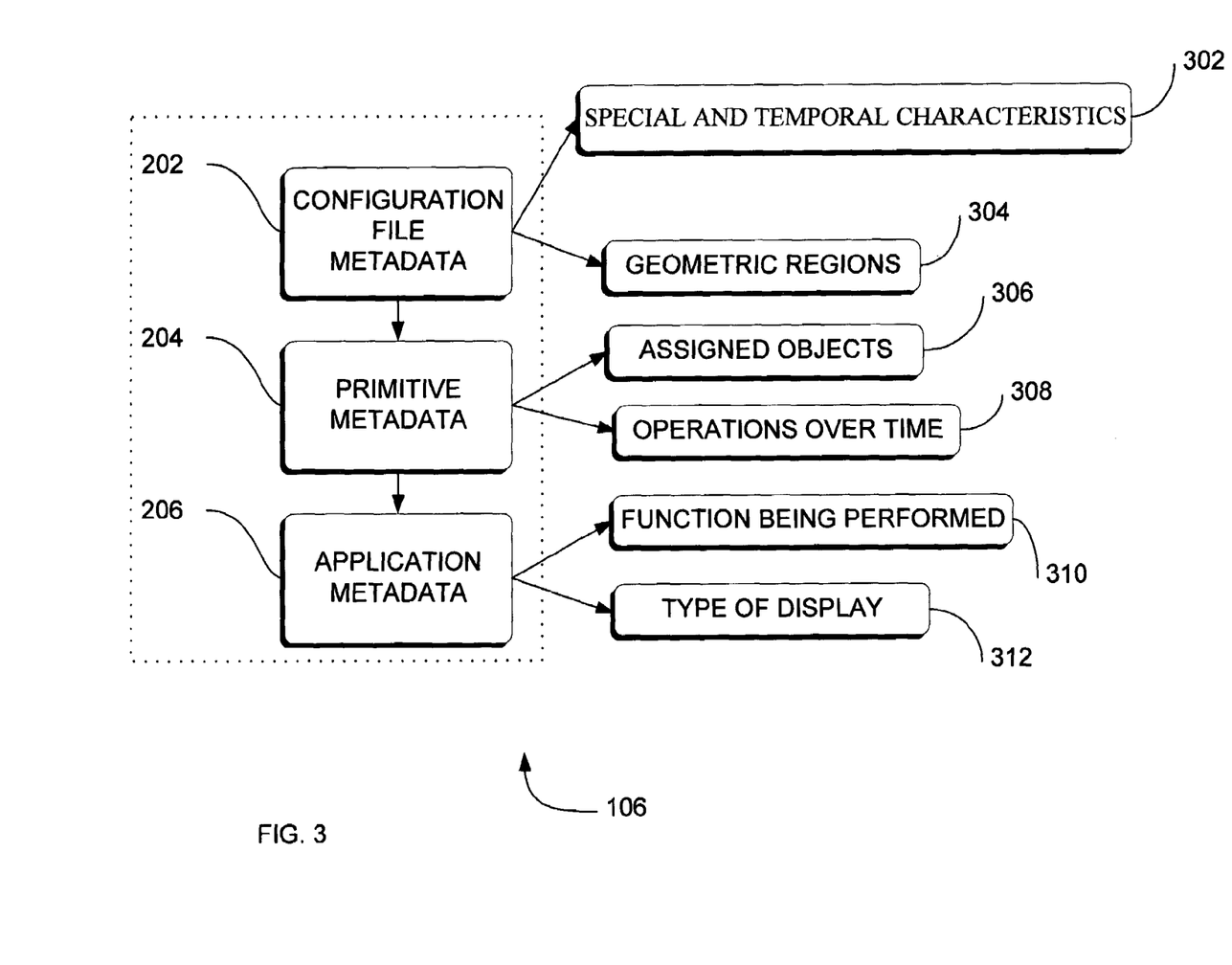
FIG. 3 illustrates the detailed view of configuration, primitive, and application metadata according to an embodiment for compression of input data.

FIG. 3 is a block diagram that provides a system level overview of the metadata extractor 106 for exchanging data between a rendering engine 104 and a display device 120 and in particular the functions performed by each metadata module. System 106 solves the need in the art for increasing the throughput of a communication channel.

Configuration file metadata 202 is a library function that may be precompiled and that can be called from the source code when performing compression function. The function when call examines the configuration file that defines the geometric regions of the frame buffer and declares the gross special and temporal characteristics of the region. This information is then used to select the appropriate codec for each region of the rendering engine's 104 data stream.

Primitive metadata 204 is a library function that may be precompiled and that can be called from the source code when performing the compression function. The function determines the assigned objects 306 selected to perform the rendering operation by rendering engine 104. Further, the function looks at the distribution of rendering operations over time 308 to determine the appropriate compression algorithm to use at the compression engine.

Application metadata 206 is a library function that may be precompiled and that can be called from the source code when performing the compression function. The application metadata uses the function being performed 310 at the source and the type of display 312 at computer 124 so as to select the appropriate compression algorithm.

The power of the compression engine 106 is the ability to look at the characteristic of the regions to be assigned to the frame buffer 118, the objects being used by rendering engine 104, and the application being selected by the rendering engine to select the appropriate compression algorithm so as to preserve data fidelity and optimize computational resources.

Figure 4:
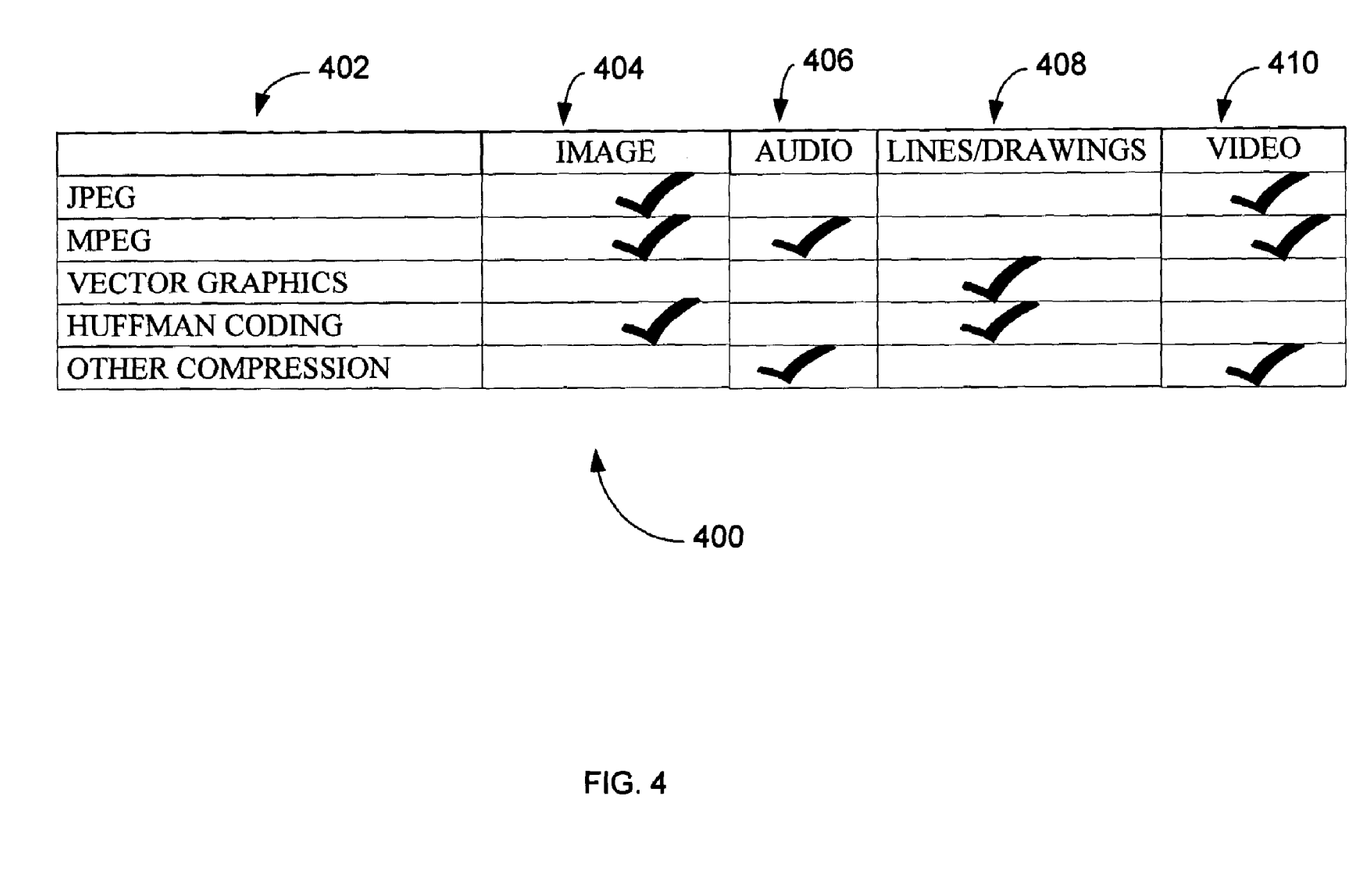
FIG. 4 is a table illustrating content and compression methods that can be used to compress input data.

FIG. 4 shows a table that is illustrative of the media content 404, 406, 408, 410 and the different compression algorithm 402 that may be selected when choosing to compress a data stream. Since the data stream from the rendering engine may contain one or more media content it is the aim of the compression engine 106 to select the most appropriate compression algorithm by analyses of the metadata as explained above in FIG. 3.

Joint Photographic Experts Group (JPEG) compression is suited for image content 404 and video content 410. JPEG compression is suitable for graceful degradation where image quality can be maintained at the cost of a lower frame rate at decreased bandwidth, constant image quality regardless of image complexity; Standard compression and decompression available; low-cost coding and decoding; faster and simpler to perform content searches and do image manipulation; less computation-intensive so many channels can be decoded and shown on a display monitor; low latency encoding and decoding which is good for live video and clear individual images; and, resiliency which equates to fast image stream recovery in the event of packet loss. However, JPEG requires high bandwidth consumption and storage requirements at frame rates higher than five (5) frames per second; and, there is no support for synchronized sound.

Moving Picture Experts Group (MPEG) compression algorithm is suited for constant frame rate (CBR), high compression which leads to low bandwidth requirements at frame rates higher than five fps, low storage requirements at frame rates higher than five fps, and due to the to constant bit rate simplifies network design and bandwidth provisioning can be maintained. MPEG however, requires complex compression processing requirements and due its low robustness all video is lost if bandwidth goes below a certain threshold.

Vector graphics is better suited for lines and drawings conveyed as a list of instructions detailing how to recreate an image using a sequence of shapes, lines, and transformations. This is similar to reproducing a painting by precisely recording the brush strokes, paint selection and mixing and then recreating the sequence of brush strokes originally used to produce it. Vector graphics are usually data efficient, especially when compressed, with minimal storage and bandwidth requirements. They are rendered without pixilation when printed or scaled, even when magnified or enlarged. Vector graphics thus can reproduce graphics with limited precision detail, allowing it to be broken down into fundamental shapes and curves.

Huffman coding offers simplicity in implementation since it can be carryout by table lookup, and for a given block size Huffman coding gives the best coding efficiency. Huffman coding, however needs to obtain source statistics that can lead to high computational cost.

Other compression algorithms are possible in the compression engine 106. In addition to the above algorithms, the user of the rendering engine 104 can select a more appropriate algorithm without departing from the main advantage of system 100. Other algorithms are H261, Wavelet Compression, Fractal Compression, and Macromedia Flash.

The system level overview of the operation of an embodiment has been described in this section of the detailed description. A data compression arrangement was described for transferring data between a rendering engine 104 and a computer such as computer 124. Some embodiments operate in a multi-processing, multi-threaded operating environment on a computer, such as computer 122 in FIG. 1 and FIG. 8.

While the system 100 is not limited to any particular network arrangement, for sake of clarity a simplified local area network has been described.

Methods of an Embodiment

In the previous section, a system level overview of the operation of an embodiment was described. In this section, the particular methods performed by the server and the clients of such an embodiment are described by reference to a series of flowcharts. Describing the methods by reference to a flowchart enables one skilled in the art to develop such programs, firmware, or hardware, including such instructions to carry out the methods on suitable computerized clients the processor of the clients executing the instructions from computer-readable media. Similarly, the methods performed by the server computer programs, firmware, or hardware are also composed of computer-executable instructions. Methods 500, 600, 700 and 900 are performed by a client program executing on, or performed by firmware or hardware that is a part of, a computer, such as computer 122 in FIG. 2, and is inclusive of the acts required to be taken by the rendering engine 104, compression engine 108, and metadata extractor 106.

Figure 5:
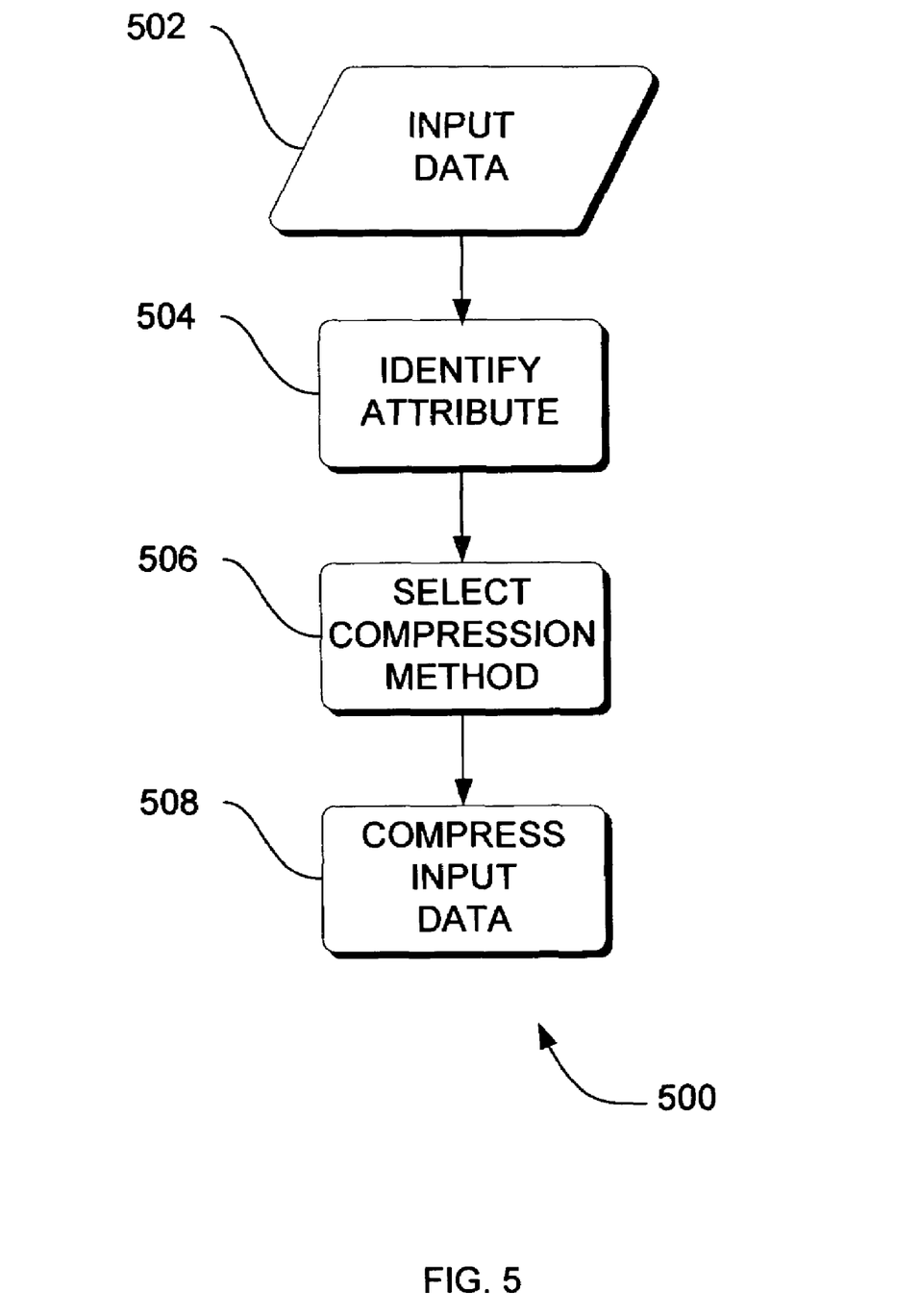
FIG. 5 is a flowchart of a method according to an embodiment for compressing input data based identified attributes.

FIG. 5 is a flowchart of a method 500 performed by a client according to an embodiment. In the present arrangement, the client is one or more computer such as computer 122, compression engine 106, or rendering engine 104. Method 500 solves the need in the art for increase throughput and for adapting to changing availability of network bandwidth as aggregate network load changes.

The method begins with action 502 where input data from the rendering engine 104 and data from the metadata extractor 106 are received and analyzed to accommodate the bandwidth requirements of the transport channel. The data from the rendering engine 104 is a mixed media stream representing video, text, graphics, drawings, and audio. The mixed video can be displayed or reproduced at computer 124 by invoking the appropriate display drivers, audio drivers, or other devices. The displays can be tile, framed, or split to display each individual media. Once the input data has been received in action 502 control passes to action 504 for further processing.

In action 504, attributes for the input data stream are determined. The attribute is at least one of configuration file metadata, primitive metadata, application metadata. Each of these attributes represents metadata, data describing the input data stream, which is usable by the compression engine 108 to condense efficiently the mixed media stream to accommodate the bandwidth requirements of the channel of communication such as local area network 102. Once the attribute have been determined control passes to action 506 for further processing.

In action 506, the compression algorithm is selected for the input data stream based on the identified attributes in action 504. The compression engine 108 with the identified attribute selects the appropriate algorithm to compress the input data stream. The selected compression algorithm can be unique for each region of the input data stream or universal for each region of the input data stream. When the stream is a mixed media stream then each region of media is compressed based on the most appropriate compression algorithm for that region. When an image is part of the input data stream then a JPEG algorithm is likely to be selected, in the case of lines and drawings then Vector Graphics compression or possibly Huffman Coding. In the case of video then MPEG compression algorithm is selected. In the alternative, a single algorithm may be selected for any media in the input stream. In cases where there is an increase in bandwidth, it is anticipated that compression may not be needed or the compression ratio may be relaxed to reduce delays that are inherently associated with having to perform compression operations. After the compression algorithm has been selected for each media or region, control passes to action 508 for further processing.

In action 508, the input data stream is compressed in accordance with the selected compression selected in action 506. After the compression the input stream is introduced into the local area network so as to be rendered at display 120 or stored in file repository 110 for later use.

Figure 6:
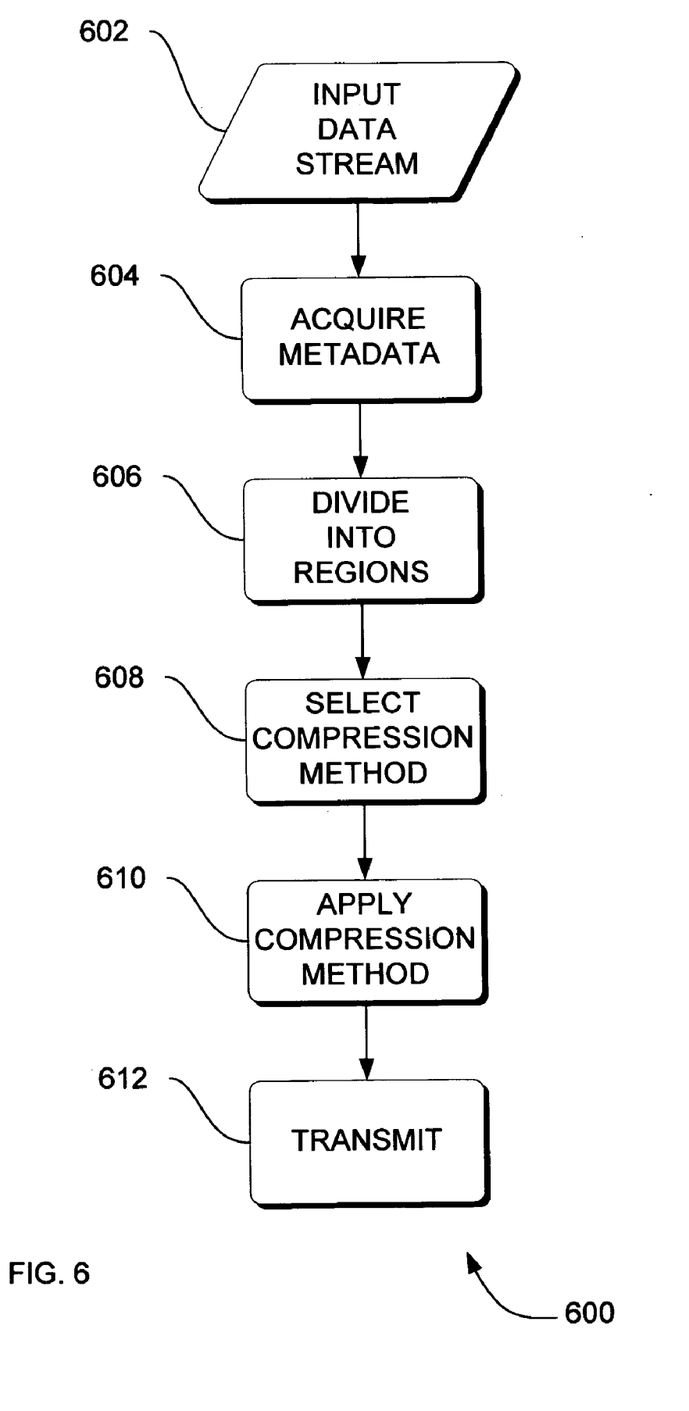
FIG. 6 is a flowchart of a method according to an embodiment for compressing input data based on acquired metadata.

FIG. 6 is a flowchart of a method 600 performed by a client according to an embodiment. In the present arrangement the client is one or more computer such as computer 122, compression engine 106, or rendering engine 104. Method 600 solves the need in the art for increase throughput and for adapting to changing availability of network bandwidth as aggregate network load changes.

The method 600 begins with action 602 where input data from the rendering engine 104 and data from the metadata extractor 106. The data from the rendering engine 104 represents video, text, graphics, drawings, and audio which collectively are called mixed media stream. The mixed video can be displayed or reproduced at computer 124 by invoking the appropriate display drivers, audio drivers, or other devices. The displays can be tile, framed, or split to display each individual media. Once the input data has been received in action 602 control passes to action 604 for further processing.

In action 604, metadata is acquired for the mixed media data. The attribute is at least one of configuration file metadata, primitive metadata, application metadata. Each of these attributes represents metadata, data describing the input data stream, which is usable by the compression engine 108 to condense efficiently the mixed media stream to accommodate the bandwidth requirements of the channel of communication such as local area network 102. Once the metadata has been acquired control passes to action 606 for further processing.

In action 606, the mixed media data is divided into regions. Each region of the mixed media data, which can be mapped to the display 120 and the frame buffer 118, is divided into its categorical components such as text, video, images, graphics, and other media. After the mixed media data is divided into regions control then passes to action 608 for further processing.

In action 608, the compression algorithm is selected for the input data stream based on the acquired metadata 604 and the divided regions 606. The compression engine 108 with the acquired metadata for each region selects the appropriate algorithm to compress the input data stream. When the stream is a mixed media stream then each region of media is compressed based on the most appropriate compression algorithm for that region. When an image is part of the input data stream then a JPEG algorithm is likely to be selected, in the case of lines and drawings then Vector Graphics compression or possibly Huffman Coding. In the case of video then MPEG compression algorithm is selected. In cases where there is an increase in bandwidth, it is anticipated that compression may not be needed or the compression ratio may be relaxed to reduce delays that are inherently associated with having to perform compression operations. After the compression algorithm has been selected for each media or region, control passes to action 610 for further processing.

In action 610, each region of the input data stream is compressed in accordance with the compression algorithm selected in action 608. After the compression the input stream is introduced into the local area network to be rendered at display 120 or stored in file repository 110 for later use.

In action 612, the input data stream is introduced into the flow of the local area network to be reproduced or stored at another spot of the network. When received by computer 124 it is reproduced at display 120. When is received by storage server 110 for later retrieval by the rendering engine 104 or displayed at 120 by computer 124.

Figure 7:
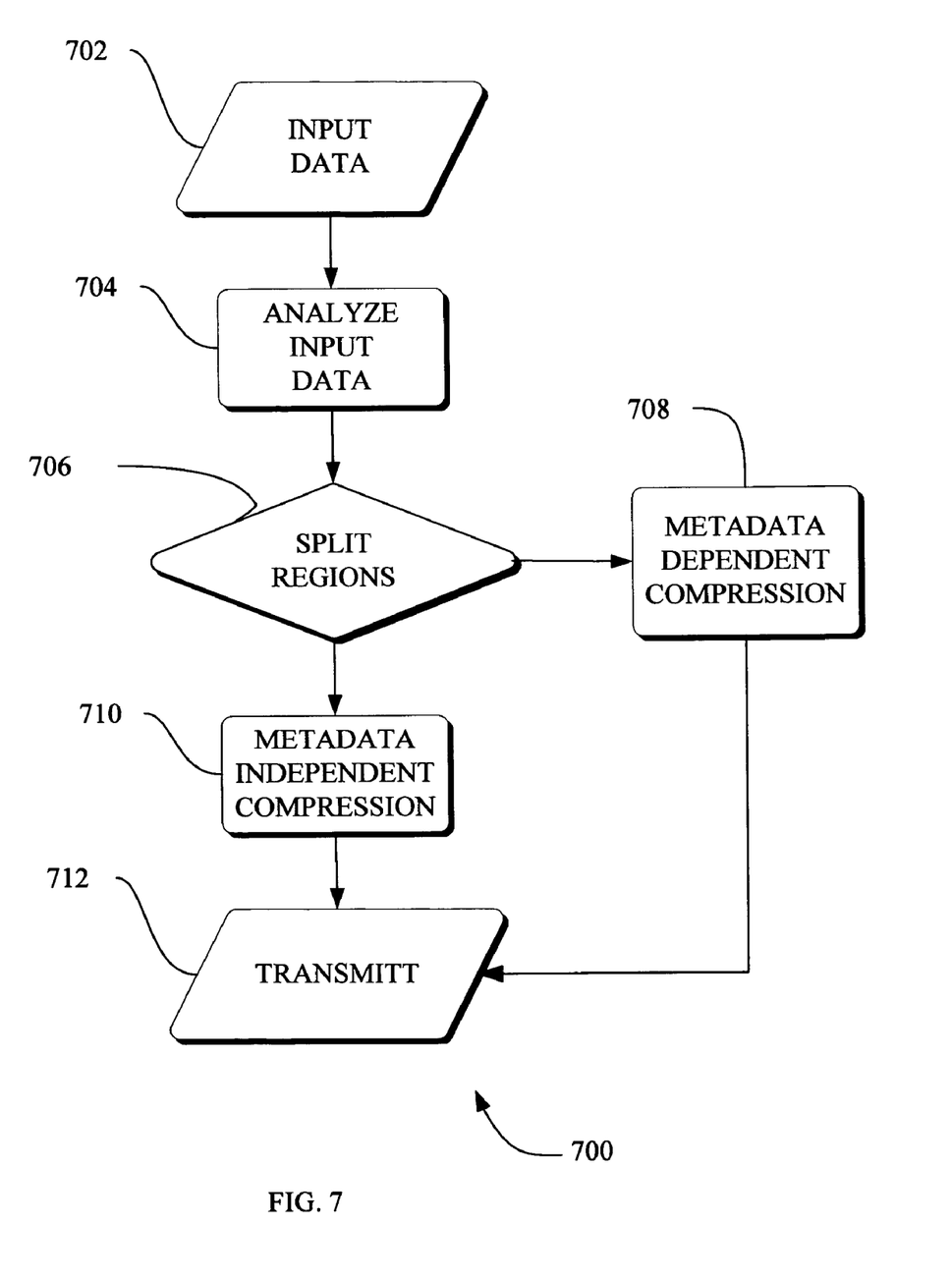
FIG. 7 is a flowchart of a method according to an embodiment for compressing input data based on acquired independent or dependent metadata.

FIG. 7 is a flowchart of method 700 that forms an embodiment. Method 700 solves the need in the art for increasing the throughput a network.

FIG. 7 begins with action 702 where an input data stream is received. The input data stream is data that is text, video, images or other media that originates at rendering engine 104 and untimely rendered at display 120. Once the input has been received, control passes to action 704 for further processing.

In action 704, the input data is analyzed to determine what the type of media is being rendered for each of the regions of the media stream. As noted earlier the regions can be one or more text, video, image, or other media. Once the regions of the input data stream have been identified control passes to action 706 for further processing.

In action 706, the input stream is split or divided between metadata dependent regions and metadata independent regions. The purpose of the split is to determine those regions were metadata information exist and can lead to the selection of a compression algorithm that is narrowly tailored to the type of media in that region. Once this discriminant function is performed the regions that are metadata dependent are compressed 708 using the most appropriate algorithm for the identified regions. The metadata independent regions are compressed 710 using either a default compression algorithm. It should be noted that for both the metadata dependent and independent there may be occasion where not compression the region would be selected. In those rare occasions the region is sent through the transmission channel without any compression. After the regions have been compressed control passes to action 712 for further processing.

In action 712, the input data stream is transmitted through the channel to be displayed at display 120 or stored in storage server 110.

Figure 8:
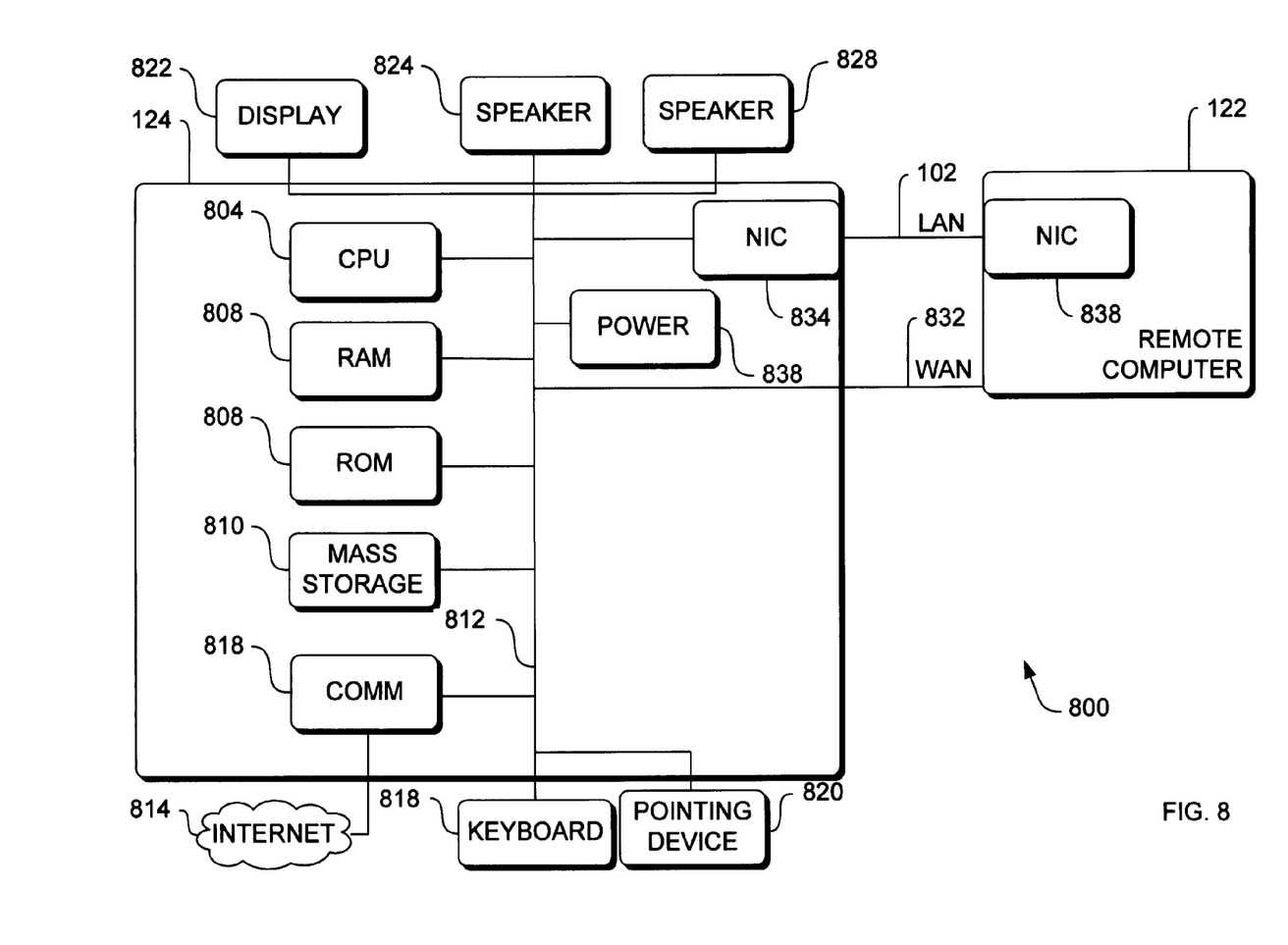
FIG. 8 is a block diagram of the hardware and operating environment in which different embodiments can be practiced.

In some embodiments, methods 500-700 are implemented as a computer data signal embodied in a carrier wave, that represents a sequence of instructions which, when executed by a processor, such as processor 804 in FIG. 8, cause the processor to perform the respective method. In other embodiments, methods 500-700 are implemented as a computer-accessible medium having executable instructions capable of directing a processor, such as processor 804 in FIG. 8, to perform the respective method. In varying embodiments, the medium is a magnetic medium, an electronic medium, or an optical medium.

Hardware and Operating Environment

FIG. 8 is a block diagram of the hardware and operating environment 800 in which different embodiments can be practiced. The description of FIG. 8 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 124 includes a processor 804, commercially available from Intel, Motorola, Cyrix and others. Computer 124 also includes random-access memory (RAM) 806, compression and decompression engines 116, frame buffer 118, read-only memory (ROM) 808, and one or more mass storage devices 810, and a system bus 812, that operatively couples various system components to the processing unit 804. The memory 806, 808, and mass storage devices, 810, are types of computer-accessible media. Mass storage devices 810 are more specifically types of nonvolatile computer-accessible media and can include one or more hard disk drives, floppy disk drives, optical disk drives, and tape cartridge drives. The processor 804 executes computer programs stored on the computer-accessible media.

Computer 124 can be communicatively connected to the Internet 814 via a communication device 816. Internet 814 connectivity is well known within the art. In one embodiment, a communication device 816 is a modem that responds to communication drivers to connect to the Internet via what is known in the art as a "dial-up connection." In another embodiment, a communication device 816 is an Ethernet® or similar hardware network card connected to a local-area network (LAN) that itself is connected to the Internet via what is known in the art as a "direct connection" (e.g., T1 line, etc.).

A user enters commands and information into the computer 124 through input devices such as a keyboard 818 or a pointing device 820. The keyboard 818 permits entry of textual information into computer 124, as known within the art, and embodiments are not limited to any particular type of keyboard. Pointing device 820 permits the control of the screen pointer provided by a graphical user interface (GUI) of operating systems such as versions of Microsoft Windows®. Embodiments are not limited to any particular pointing device 820. Such pointing devices include mice, touch pads, trackballs, remote controls and point sticks. Other input devices (not shown) can include a microphone, joystick, game pad, satellite dish, scanner, or the like.

In some embodiments, computer 124 is operatively coupled to a display device 822. Display device 822 is connected to the system bus 812. Display device 822 permits the display of information, including computer, video and other information, for viewing by a user of the computer. Embodiments are not limited to any particular display device 822. Such display devices include cathode ray tube (CRT) displays (monitors), as well as flat panel displays such as liquid crystal displays (LCD's). In addition to a monitor, computers typically include other peripheral input/output devices such as printers (not shown). Speakers 824 and 826 provide audio output of signals. Speakers 824 and 826 are also connected to the system bus 812.

Computer 124 also includes an operating system (not shown) that is stored on the computer-accessible media RAM 806, ROM 808, and mass storage device 810, and is and executed by the processor 804. Examples of operating systems include Microsoft Windows®, Apple MacOS®, Linux®, UNIX®. Examples are not limited to any particular operating system, however, and the construction and use of such operating systems are well known within the art.

Embodiments of computer 124 are not limited to any type of computer 124. In varying embodiments, computer 124 comprises a PC-compatible computer, a MacOS®-compatible computer, a Linux®-compatible computer, or a UNIX®-compatible computer. The construction and operation of such computers are well known within the art.

Computer 124 can be operated using at least one operating system to provide a graphical user interface (GUI) including a user-controllable pointer. Computer 124 can have at least one web browser application program executing within at least one operating system, to permit users of computer 124 to access intranet or Internet world-wide-web pages as addressed by Universal Resource Locator (URL) addresses. Examples of browser application programs include Netscape Navigator® and Microsoft Internet Explorer®.

The computer 124 can operate in a networked environment using logical connections to one or more remote computers, such as remote computer 122. These logical connections are achieved by a communication device coupled to, or a part of, the computer 124. Embodiments are not limited to a particular type of communications device. The remote computer 122 can be another computer, a server, a router, a rendering engine 104, a compression engine 102, a network PC, a client, a peer device or other common network node. The logical connections depicted in FIG. 8 include a local-area network (LAN) 830 and a wide-area network (WAN) 832. Such networking environments are commonplace in offices, enterprise-wide computer networks, intranets and the Internet.

When used in a LAN-networking environment, the computer 124 and remote computer 122 are connected to the local network 830 through network interfaces or adapters 834, which is one type of communications device 816. Remote computer 122 also includes a network device 836. When used in a conventional WAN-networking environment, the computer 124 and remote computer 122 communicate with a WAN 832 through modems (not shown). The modem, which can be internal or external, is connected to the system bus 812. In a networked environment, program modules depicted relative to the computer 124, or portions thereof, can be stored in the remote computer 122.

Computer 124 also includes power supply 838. Each power supply can be a battery.

Implementation

Figure 9:
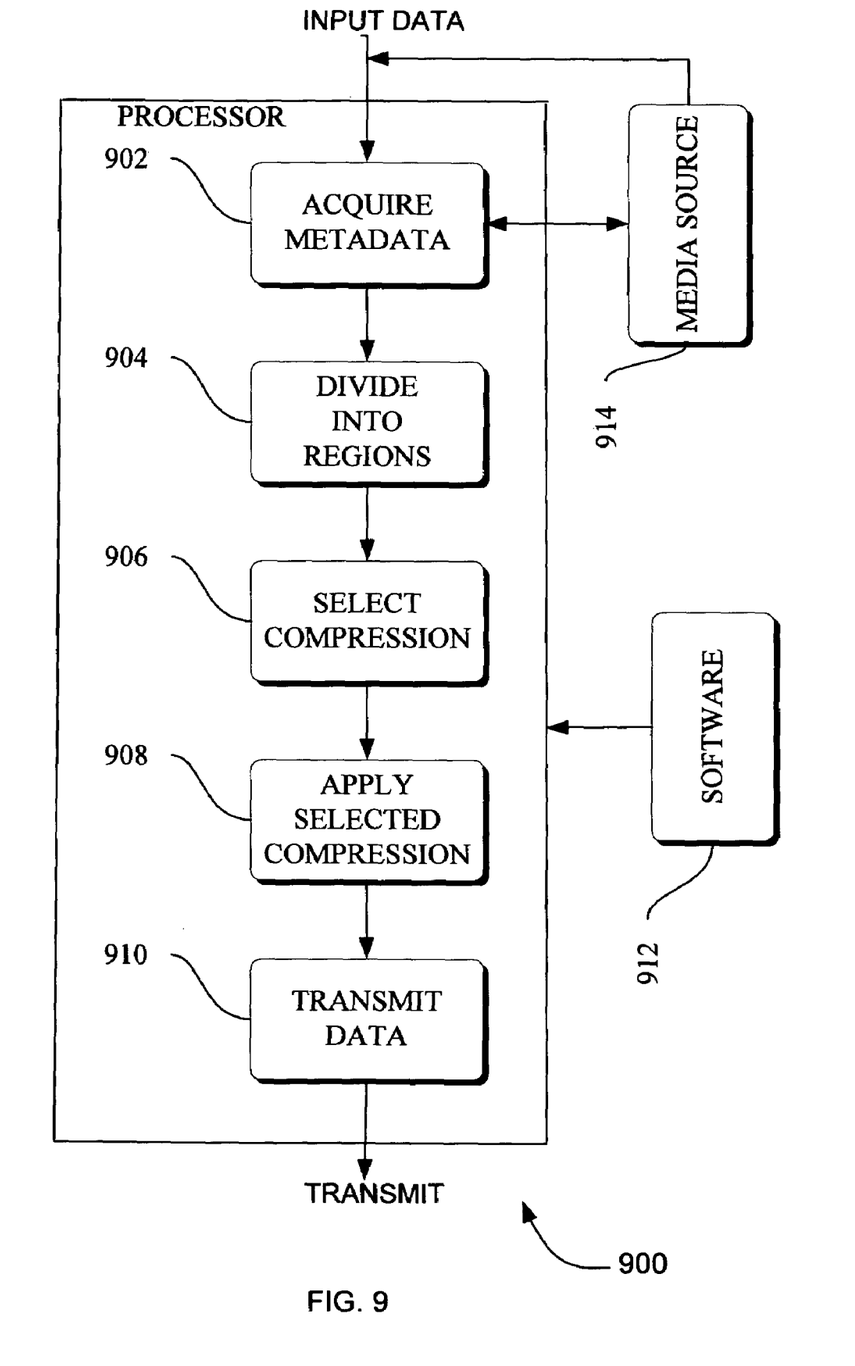
FIG. 9 is a block representation of the operations performed by the processor for compressing input data.

Referring to FIG. 9, a particular implementation 900 is described in conjunction with the system overview in FIG. 8 and the methods described in conjunction with FIGS. 5, 6 and 7. The figures use the Unified Modeling Language (UML), which is the industry-standard language to specify, visualize, construct, and document the object-oriented artifacts of software systems. In the figure, a hollow arrow between classes is used to indicate that a child class below a parent class inherits attributes and methods from the parent class. In addition, a solid-filled diamond is used to indicate that an object of the class that is depicted above an object of another classes is composed of the lower depicted object. Composition defines the attributes of an instance of a class as containing an instance of one or more existing instances of other classes in which the composing object does not inherit from the object(s) it is composed of.

FIG. 9 is a block diagram of the hardware and operating environment 800 in which different embodiments can be practiced. Apparatus 900 solves the need in the art for increase throughput and for adapting to changing availability of network bandwidth as aggregate network load changes.

Figure 10:
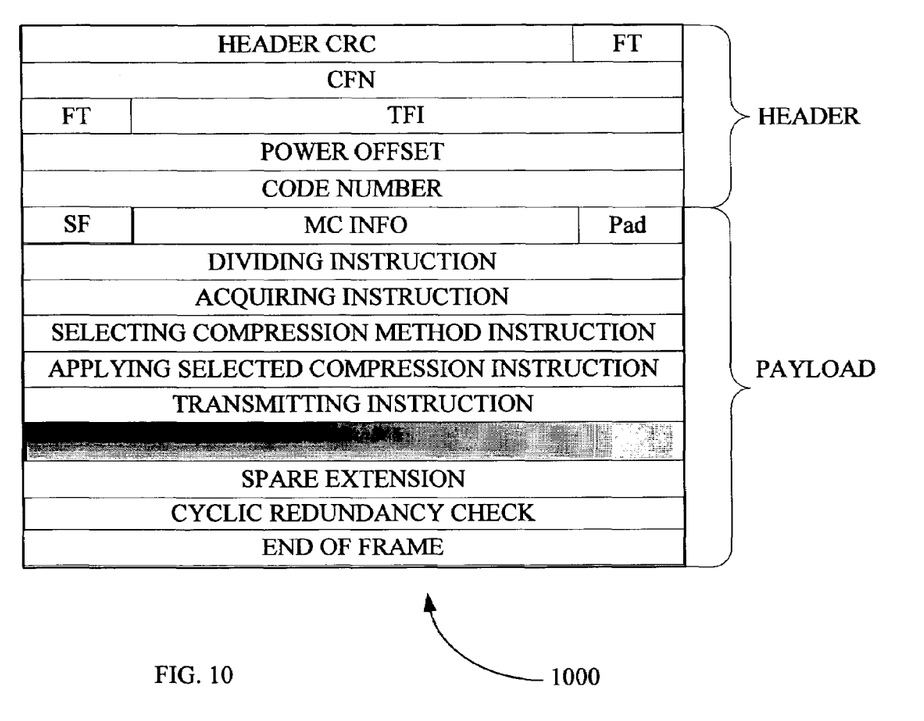
FIG. 10 is a diagram of a data frame with instruction that when executed by a processor compresses input data.

Apparatus 900 receives software 912 from a computer-accessible medium, a carrier wave signal for operating apparatus 900. FIG. 10 shows the transport using frame relay with a header for error checking and for delivery of the payload to the correct server or apparatus 900. The payload as shown consist of the instructions that when compiled by apparatus 900 causes a processor like 804 to perform the actions of compressing the regions of the data stream with a selected compression algorithm. The software may be operations for causing the apparatus to perform the method of compressing an input media stream, in the alternative the software can be instructions for performing the method and for operating apparatus 900 in accordance to the operating system being used and to produce data and instruction the format being employed to send compressed data through a communication channel.

The input data stream is received by apparatus 900 from media source 914. As noted earlier the input data stream consists of one or more video, text, image, or other media.

After the apparatus has been configured to perform the method by employing software instructions 912, the apparatus is then ready to receive the input data stream 914 and to process the data stream for transmission.

In action 904, metadata is acquired for the mixed media data. The attribute is at least one of configuration file metadata, primitive metadata, application metadata. Each of these attributes represents metadata, data describing the input data stream, which is usable by the compression engine 108 to condense efficiently the mixed media stream to accommodate the bandwidth requirements of the channel of communication such as local area network 102. Once the metadata has been acquired control passes to action 904 for further processing.

In action 904, the mixed media data is divided into regions. Each region of the mixed media data, which can be mapped to the display 120 and the frame buffer 118, is divided into its categorical components such as text, video, images, graphics, and other media. After the mixed media data is divided into regions control then passes to action 906 for further processing.

In action 906, the compression algorithm is selected for the input data stream based on the acquired metadata 902 and the divided regions 904. The compression engine 108 with the acquired metadata for each region selects the appropriate algorithm to compress the input data stream. When the stream is a mixed media stream then each region of media is compressed based on the most appropriate compression algorithm for that region. When an image is part of the input data stream then a JPEG algorithm is likely to be selected, in the case of lines and drawings then Vector Graphics compression or possibly Huffman Coding. In the case of video then MPEG compression algorithm is selected. In cases where there is an increase in bandwidth, it is anticipated that compression may not be needed or the compression ratio may be relaxed to reduce delays that are inherently associated with having to perform compression operations. After the compression algorithm has been selected for each media or region, control passes to action 908 for further processing.

In action 908, each region of the input data stream is compressed in accordance with the compression algorithm selected in action 906. After the compression the input stream is introduced into the local area network to be rendered at display 120 or stored in file repository 110 for later use.

In action 910, the input data stream is introduced into the flow of the local area network to be reproduced or stored at another spot of the network. When received by computer 124 it is reproduced at display 120. When is received by storage server 110 for later retrieval by the rendering engine 104 or displayed at 120 by computer 124.

Apparatus 900 components 902-910 can be embodied as computer hardware circuitry or as a computer-readable program, or a combination of both. In another embodiment, system 900 is implemented in an application service provider (ASP) system.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 122 or 124 in FIG. 8, or on at least as many computers as there are components.

Conclusion

A system and method foe data compression has been described. Although specific embodiments have been illustrated and described herein, it will be appreciated by those of ordinary skill in the art that any arrangement calculated to achieve the same purpose may be substituted for the specific embodiments shown. This application is intended to cover any adaptations or variations. For example, although described in object-oriented terms, one of ordinary skill in the art will appreciate that implementations can be made in a procedural design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

I claim:

1. A method for compressing data between a source data device and a remote video frame buffer, comprising:
    receiving source data from the source data device, the source data having one or more media regions that correspond to a video frame buffer location in the remote video frame buffer;
    identifying metadata, at a computer, that describes the one or more media regions that correspond to the remote video frame buffer location;
    performing a metadata dependent data compression on the region, if the metadata of the region is identified; and
    selecting a metadata independent data compression on a region that is not metadata identified.

2. The method of claim 1, wherein identifying metadata further comprises:
    identifying one of configuration file metadata, source primitive metadata, application high-level metadata;
    wherein selecting metadata independent data compression further comprises:
    one of MPEG compression, JPEG image compression, vector graphics compression, Huffman coding, H.261, user selected.

3. The method of claim 2, wherein identifying metadata further comprises:
    one of:
    identifying application high-level metadata on functions and type of display for regions of input data,
    identifying source primitive metadata on application metadata from primitive operations,
    identifying information defining regions of the input data, and
    identifying information defining special and temporal characteristics of input data regions.

4. A method for transmitting mixed media stream data from a data processor over a communication link to a remote frame buffer for displaying, the method comprising:

dividing the mixed media stream data into a number of regions, the regions representing mixed media stream to be displayed;

acquiring from the data processor a metadata attribute that defines each region of the mixed media stream data;

selecting a compression method for each region of the mixed media stream data on the basis of the acquired metadata attribute that defines each region of the mixed media stream data;

applying the selected compression method for each region of the mixed media stream data; and transmitting the compressed mixed media stream data over the communication link to the frame buffer for displaying.

5. The data compression method of claim 4, wherein the metadata attribute further comprises one of configuration file metadata, source primitive metadata, application high-level metadata.

6. The data compression method of claim 5, wherein the metadata attribute of the configuration file metadata further comprises at least one of information defining geometric regions of the input data and information defining special and temporal characteristics of input data regions.

7. The data compression method of claim 5, wherein the metadata attribute of the source primitive metadata further comprises application metadata from primitive operations.

8. The data compression method of claim 5, wherein the metadata attribute of application high-level metadata further comprises information describing functions and type of display for regions of the input data.

9. The data compression method of claim 4, wherein selecting at least one data compression method further comprises one of MPEG compression, JPEG image compression, vector graphics compression, Huffman coding, H.261, user selected.

10. The data compression method of claim 4, wherein a metadata attribute further comprises one of application high-level metadata on functions and type of display for regions of input data, source primitive metadata on application metadata from primitive operations, information defining regions of the input data, information defining special and temporal characteristics of input data regions; and wherein selecting at least one data compression method is one of MPEG compression, JPEG image compression, vector graphics compression, Huffman coding, H.261, user selected.

11. A computer-accessible storage memory having executable instructions to transmitting mixed media stream data from a data processor over a communications link to a remote frame buffer for displaying , the executable instructions capable of directing a processor to perform:

dividing the mixed media stream data into a number of regions, the regions representing mixed media stream to be displayed;

acquiring from the data processor metadata that defines each region of the mixed media stream data;

selecting a compression method for each region of the mixed media stream data on the basis of the acquired metadata that defines each region of the mixed media stream data;

applying the selected compression method for each region of the mixed media stream data; and transmitting the compressed mixed media stream data over the communication link to the frame buffer for displaying.

12. The computer-accessible storage memory of claim 11, wherein acquiring is one of identifying application high-level metadata on functions and type of display for regions of the mixed media stream data, identifying source primitive metadata on application metadata from primitive operations, identifying information defining special and temporal characteristics of the mixed media stream data regions.

13. A computerized system for compressing at least one set of input data comprising:

a device for identifying at least one attribute of the input data, wherein the at least one attribute further comprises one of configuration file metadata, source primitive metadata, application high-level metadata;

a device for selecting at least one data compression method in response to the identified attribute; and a device for compressing the set of input data with the selected at least one data compression method.

14. The computerized system of claim 13, further comprising a transmitter for transmitting the compressed data over a communication link to a frame buffer for display.

15. The computerized system of claim 14, wherein the attribute of configuration file metadata further comprises at least one of information defining regions of the input data, information defining special and temporal characteristics of input data regions.

16. The computerized system of claim 14, wherein the attribute of source primitive metadata further comprises application metadata from primitive operations.

17. The computerized system of claim 14, wherein the attribute of application high-level metadata further comprises information describing functions and type of display for regions of the input data.

18. The computerized system of claim 17, wherein selecting at least one data compression method further comprises one of MPEG compression, JPEG image compression, vector graphics compression, Huffman coding, H.261, user selected.

19. The computerized system of claim 18, wherein an attribute further comprises one of application high-level metadata describing functions and type of display for regions of input data, source primitive metadata on application metadata from primitive operations, information defining regions of the input data, information defining special and temporal characteristics of input data regions; and wherein selecting at least one data compression method further comprises one of MPEG compression, JPEG image compression, vector graphics compression, Huffman coding.

20. A computerized system for transmitting mixed media stream data from a data processor over a communications link to a remote frame buffer for displaying, comprising:

device for dividing the mixed media stream data into a number of regions, the regions representing mixed media stream to be displayed;

device for acquiring from the data processor metadata that defines each region of the mixed media stream data;

device for selecting a compression method for each region of the mixed media stream data on the basis of the acquired metadata that defines each region of the mixed media stream data;

device for applying the selected compression method for each region of the mixed media stream data; and transmitter for transmitting the compressed mixed media stream data over the communication link to the frame buffer for displaying.

21. The computerized system of claim 20, wherein acquiring further comprises one of identifying application high-level metadata on functions and type of display for regions of the mixed media stream data, identifying source primitive metadata on application metadata from primitive operations, identifying information defining special and temporal characteristics of the mixed media stream data regions.

22. A system to exchange mixed media stream data from a media source over a communications link to a remote frame buffer for displaying comprising:
a processor;
a storage device coupled to the processor; and
software means operative on the processor for:
dividing the mixed media stream data into a number of regions, the regions representing mixed media stream to be displayed;
acquiring from the media source metadata that defines each region of the mixed media stream data;
selecting a compression method for each region of the mixed media stream data on the basis of the acquired metadata that defines each region of the mixed media stream data;
applying the selected compression method for each region of the mixed media stream data; and
transmitting the compressed mixed media stream data over the communication link to the frame buffer for displaying.

23. The system of claim 22, wherein the acquiring further comprises one of:
identifying application high-level metadata describing functions and type of display for regions of the mixed media stream data,
identifying source primitive metadata on application metadata from primitive operations, and
identifying information defining special and temporal characteristics of the mixed media stream data regions.

24. A data compression system for compressing at least one set of input data comprising:
a processor;
a storage device coupled to the processor; and
software means operative on the processor for:
receiving input data;
identifying at least one metadata attribute of the input data;
selecting at least one data compression method in response to the identified metadata attribute; and
compressing the set of input data with the selected at least one data compression method.

25. The data compression system of claim 24, wherein the metadata attribute further comprises one of configuration file metadata, source primitive metadata, application high-level metadata;
wherein the metadata attribute of configuration file metadata further comprises at least one of information defining regions of the input data, information defining special and temporal characteristics of input data regions;
wherein the metadata attribute of source primitive metadata further comprises application metadata from primitive operations;
wherein the metadata attribute of application high-level metadata further comprises information on functions and type of display for regions of the input data;
wherein selecting at least one data compression system further comprises one of MPEG compression, JPEG image compression, vector graphics compression, Huffman coding, H.261, user selected.

\* \* \* \* \*